(No Model.)
W. H. MAXWELL.
METHOD OF FORMING LETTERS ON GLASS.
No. 359,682. Patented Mar. 22, 1887.
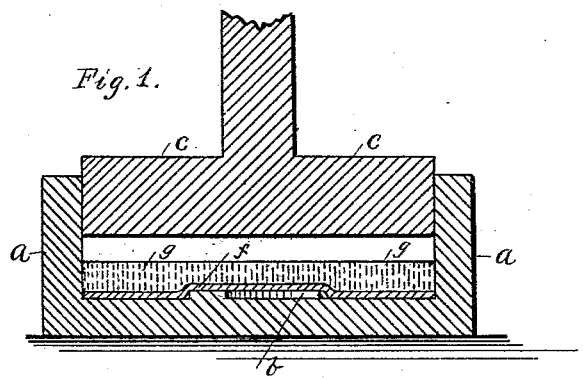
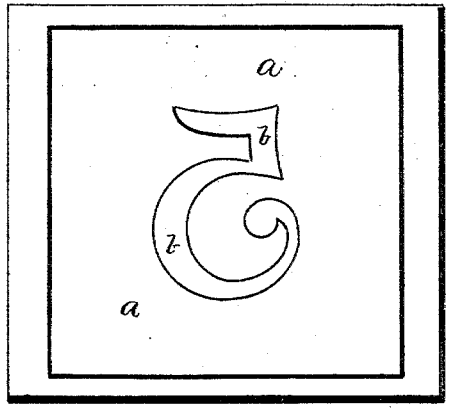
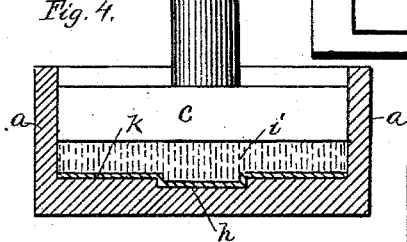
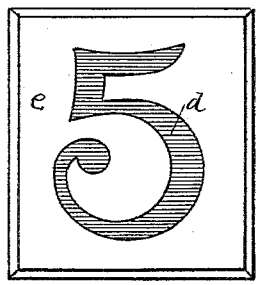
Witnesses:
E. H. Randolph
M. E. Harrison
Inventor.
William H. Maxwell
per C. D. Levis
att'y.

UNITED STATES PATENT OFFICE.

WILLIAM H. MAXWELL, OF PITTSBURG, PENNSYLVANIA.

METHOD OF FORMING LETTERS ON GLASS.

SPECIFICATION forming part of Letters Patent No. 359,682, dated March 22, 1887.

Application filed February 24, 1886. Serial No. 193,075. (No specimens.)

*To all whom it may concern:*

Be it known that I, WILLIAM H. MAXWELL, a citizen of the United States, residing at Pittsburg, in the county of Allegheny and State of Pennsylvania, have invented certain new and useful Improvements in a Process of Forming Letters or Characters on Glass; and I do hereby declare the following to be a full, clear, and exact description of the invention, such as will enable others skilled in the art to which it pertains to make and use the same, reference being had to the accompanying drawings, which form a part of this specification.

My invention relates to an improvement in the method of or process for forming letters or characters on glass, the object being to form a letter or character on the surface of a plate of glass of one or more different colors or shades of glass; and with this end in view my invention consists in certain details of construction and combination of parts, as will be more fully explained hereinafter.

In the accompanying drawings, Figure 1 is a sectional elevation of the mold used in connection with my invention, having at the bottom the letters or characters to be formed on the glass plate and slightly raised above the surface of the same. Fig. 2 is a plan view of the same having the plunger removed therefrom. Fig. 3 represents a figure formed on a plate of glass, such as is produced from the above-mentioned mold. Fig. 4 is a sectional elevation of a mold having at the bottom the impression of such letters or characters as it may be desired to form on the glass, the product of the same differing from the former by surrounding the figures by colored glass.

To put my invention into practice I construct a rectangular or other shaped box, $a$, of the desired size, in the bottom of which any letters or characters, $b$, may be formed, slightly depressed or raised above or below the surface. Into this box or mold $a$ is fitted a plunger, $c$, which may be raised or lowered by any suitable means having the required degree of pressure.

To form characters $d$ on the surface of a plate of glass, $e$, with this mold $a$, I provide a thin light plate of colored glass, $f$, reheat the same, and place it in the bottom of the mold $a$. On the top of this reheated plate of colored glass $f$ is placed a quantity of molten clear glass, $g$, or glass of another color. The plunger $c$ is now brought into operation and unites the two colors, and bends the white or colored plate $f$, which is at the time pliable, and bends the same either over or into the figures or characters, as desired, and cements the two together solidly, forming one piece. This piece of two or more colors is now taken out of the mold $a$ and annealed, and the surface having the characters thereon ground until that part of the colored glass pressed into the clear alone remains. The surface $e$ thus ground is now polished, thus forming letters or characters $d$ on glass of one or more colors.

If it is desired to have the characters of clear glass surrounded by a colored glass, a mold such as shown at Fig. 4 on the drawings is used, which, having the characters $h$ impressed below the surface, allows the clear glass $i$ when placed on the top of the reheated colored plate $k$ to be pressed by the plunger $c$ below the real surface, and when ground and polished, as before described, the figures or characters are of clear glass surrounded by colored.

Having thus described my invention, what I claim, and desire to secure by Letters Patent, is—

The herein-described process of forming letters or characters on plates of glass, consisting of reheating a plate of colored glass, placing the same in the bottom of the mold having raised figures or characters formed thereon, or the impression of such figures or characters as it may be desired to produce on the plates of glass, then placing a quantity of molten clear glass or glass of a different color on the top of the first-mentioned plate, cementing the two together by pressure, annealing the same, and grinding or otherwise removing a portion of the surface on which the letters or characters are formed, substantially as shown and described.

WILLIAM H. MAXWELL.

Witnesses:
H. T. MORRIS,
M. E. HARRISON.